United States Patent
Iacovangelo

(10) Patent No.: US 7,056,584 B2
(45) Date of Patent: Jun. 6, 2006

(54) BOND LAYER FOR COATINGS ON PLASTIC SUBSTRATES

(75) Inventor: Charles D. Iacovangelo, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 300 days.

(21) Appl. No.: 10/269,415

(22) Filed: Oct. 11, 2002

(65) Prior Publication Data

US 2004/0071971 A1 Apr. 15, 2004

(51) Int. Cl.
*B32B 9/04* (2006.01)

(52) U.S. Cl. .................. 428/412; 428/421; 428/447; 428/452; 428/473.5; 428/474.4; 428/480; 428/500; 428/522; 427/489; 528/32; 528/37

(58) Field of Classification Search ............... 427/452; 428/412, 447
See application file for complete search history.

(56) References Cited

U.S. PATENT DOCUMENTS

| | | | |
|---|---|---|---|
| 3,161,615 A | 12/1964 | Goldberg | |
| 3,220,973 A | 11/1965 | Goldberg | |
| 3,312,659 A | 4/1967 | Kurkjy et al. | |
| 3,312,660 A | 4/1967 | Kurkjy et al. | |
| 3,313,777 A | 4/1967 | Elam et al. | |
| 3,666,614 A | 5/1972 | Snedeker et al. | |
| 3,989,672 A | 11/1976 | Vestergaard | |
| 4,194,038 A | 3/1980 | Baker et al. | |
| 4,200,681 A | 4/1980 | Hall et al. | |
| 4,210,699 A | 7/1980 | Schroeter et al. | |
| 4,224,378 A | 9/1980 | Schroeter et al. | |
| 4,242,381 A | 12/1980 | Goossens et al. | |
| 4,533,575 A * | 8/1985 | Melancon | 427/387 |
| 4,842,941 A | 6/1989 | Devins et al. | |
| 4,927,704 A | 5/1990 | Reed et al. | |
| 5,156,882 A | 10/1992 | Rzad et al. | |
| 5,463,013 A | 10/1995 | Tokuda et al. | |
| 5,510,448 A | 4/1996 | Fontane et al. | |
| 5,718,967 A | 2/1998 | Hu et al. | |
| 6,045,904 A * | 4/2000 | Torikoshi et al. | 428/334 |
| 6,397,776 B1 | 6/2002 | Yang et al. | |
| 6,420,032 B1 | 7/2002 | Iacovangelo | |
| 6,709,715 B1 * | 3/2004 | Lang et al. | 427/489 |
| 2003/0228473 A1* | 12/2003 | Benayoun et al. | 428/447 |
| 2004/0137243 A1* | 7/2004 | Gleason et al. | 428/447 |
| 2004/0212114 A1* | 10/2004 | Kashiwagi et al. | 264/30 |
| 2005/0202259 A1* | 9/2005 | Korevaar et al. | 428/447 |
| 2005/0267253 A1* | 12/2005 | Hayashi | 524/588 |

FOREIGN PATENT DOCUMENTS

JP 2005-72584 A * 3/2005

* cited by examiner

*Primary Examiner*—Marc S. Zimmer
(74) *Attorney, Agent, or Firm*—Scully, Scott, Murphy & Presser, P.C.

(57) ABSTRACT

An article of a plastic substrate and a bond layer of a plasma polymerized cyclosiloxane having select unsaturation and a method of forming same.

28 Claims, No Drawings

BOND LAYER FOR COATINGS ON PLASTIC SUBSTRATES

FIELD OF THE INVENTION

The invention relates generally to cyclosiloxanes having at least one alkenyl substituent on a silicon atom as a bond layer with plastic substrates, articles comprised of same and a method of making such articles.

BACKGROUND OF THE INVENTION

Plastics have found widespread use as a substrate material in numerous and diverse settings. Amongst other reasons, plastics are generally light weight, have high ductility and offer a high degree of visible light transmission. Certain plastics, such as polycarbonate (PC), have the added benefit of high impact strength. Applications for plastic substrates include but are not limited to automotive windows, headlamps and body panels, architectural windows, displays, solar cells and collectors, aircraft windows and canopies, and appliances. In most applications, the plastic substrate is provided with one or more functional coatings. For example, automotive windows require, at a minimum, both ultraviolet (UV) filtering coatings to protect them from exposure to sunlight, and abrasion resistant coatings to protect them from scratching. Additionally, automotive windows desirably have infra-red (IR) reflective coatings, transparent conductive coatings for heater grids, and/or electro chromic coatings. For displays, solar cells and dual-pane windows, barrier coatings to oxygen and water are important.

While providing requisite functionality, coatings oftentimes have intrinsic characteristics that ultimately prove detrimental to the final layered article. For example, many coatings have modulus values and coefficients of thermal expansion (CTE) that are significantly different than those of the underlying plastic substrate. This mismatch in properties can cause large strains in the coatings and at the layer interfaces during periods of thermal cycling and exposure to high humidity or water immersion. This in turn leads to delamination and/or cracking of the coatings.

Several approaches to address this problem have been developed. One response has been to provide compliance between the substrate and the coatings by using a graded interface. For example, U.S. Pat. No. 4,927,704 discloses formation of a graded interface by plasma enhanced chemical vapor deposition (PECVD) to provide compliance. In this approach, vinyltrimethylsilane (VTMS) or hexamethyldisiloxane (HMDSO) is used and the properties are gradually graded from that of the substrate to that of the coating. While helpful, this approach can only effectively be used in a slow deposition rate process. For low cost, high deposition rate processes that are commercially favored, this methodology is not economically practical.

Another attempt to obtain compliance has been to use single bond layers. For example, U.S. Pat. No. 5,156,882 discloses the use of organosilicones of the general formula $R^1_n SiZ_{(4-n)}$ as described in U.S. Pat. No. 4,224,378, and $R^2 Si(OH)_3$ as described in U.S. Pat. No. 4,242,381. Included among specific compounds contemplated are hexamethyldisilazane (HMDZ), HMDSO, VTMS and octamethylcyclotetrasiloxane (D4).

In U.S. Pat. No. 5,718,967 a laminate is disclosed where the first adhesion promoter layer is a plasma polymerized organosilicon polymer of dimethoxydimethylsilane (DMDMS), methyltrimethoxysilane, tetramethoxysilane, methyltriethoxysilane, diethoxydimethylsilane, methyltriethoxysilane, triethoxyvinylsilane, tetraethoxysilane, dimethoxymethlyphenylsilane, phenyltrimethoxysilane, 3-glycidoxypropyltrimethoxysilane, 3-methacryloxypropyltrimethoxysilane, diethoxymethylphenylsilane, tris(2-methoxyethoxy)vinyl silane, phenyltriethoxysilane, dimethoxydiphenylsilane, tetramethyldisiloxane (TMDSO), HMDSO, HMDZ and tetramethylsilazane.

Despite these endeavors, there is still a need for a bond layer that provides improved compliance thereby permitting more effective thermal cycling and hydrolytic stability.

SUMMARY OF THE INVENTION

The invention pertains to an article comprising a plastic substrate, and a bond layer on a surface of said plastic substrate, said bond layer comprising a plasma reacted cyclosiloxane, said cyclosiloxane having at least one $C_2$ to $C_{10}$ alkenyl group attached to a silicon atom; and a method for forming same. In one embodiment, the cyclosiloxane is heptamethyl(vinyl)tetrasiloxane.

DETAILED DESCRIPTION OF THE INVENTION

Plastic Substrate:

Without limitation plastic substrates include those comprised of thermoplastic polymers and thermoset polymers. The substrate, by way of exemplification only, typically comprises a polymer resin. For example, the substrate may comprise a polycarbonate. Polycarbonates suitable for forming the substrate are well-known in the art and generally comprise repeating units of the formula:

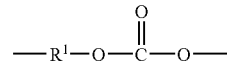

where $R^1$ is a divalent aromatic radical of a dihydric phenol (e.g., a radical of 2,2-bis(4-hydroxyphenyl)-propane, also known as bisphenol A) employed in the polymer producing reaction; or an organic polycarboxylic acid (e.g. terephthalic acid, isophthalic acid, hexahydrophthalic acid, adipic acid, sebacic acid, dodecanedioic acid, and the like). These polycarbonate resins are aromatic carbonate polymers which may be prepared by reacting one or more dihydric phenols with a carbonate precursor such a phosgene, a haloformate or a carbonate ester. One example of a polycarbonate which can be used as a plastic substrate in the present invention is LEXAN®, manufactured by General Electric Company.

Aromatic carbonate polymers may be prepared by methods well known in the art as described, for example, in U.S. Pat. Nos. 3,161,615; 3,220,973; 3,312,659; 3,312,660; 3,313,777; 3,666,614; 3,989,672; 4,200,681; 4,842,941; and 4,210,699.

The plastic substrate may also comprise a polyestercarbonate which can be prepared by reacting a carbonate precursor, a dihydric phenol, and a dicarboxylic acid or ester forming derivative thereof. Polyestercarbonates are described, for example in, U.S. Pat. Nos. 4,454,275; 5,510,448; 4,194,038; and 5,463,013.

The plastic substrate may also comprise a thermoplastic or thermoset material. Examples of suitable thermoplastic materials include polyethylene, polypropylene, polystyrene, polyvinylacetate, polyvinylalcohol; polyvinylacetal, polymethacrylate ester, polyacrylic acids, polyether, polyester, polycarbonate, cellulous resin, polyacrylonitrile, polyamide, polyimide, polyvinylchloride, fluorine-containing resins and polysulfone. Examples of suitable thermoset materials include epoxy and urea melamine.

Acrylic polymers, also well known in the art, are another material from which the plastic substrate may be formed. Acrylic polymers can be prepared from monomers such as methyl acrylate, acrylic acid, methacrylic acid, methyl methacrylate, butyl methacrylate, cyclohexyl methacrylate, and the like. Substituted acrylates and methacrylates, such as hydroxyethyl acrylate, hydroxybutyl acrylate, 2-ethylhexylacrylate, and n-butylacrylate may also be used.

Polyesters may also be used to form the plastic substrate. Polyesters are well-known in the art, and may be prepared by the polyesterification of organic polycarboxylic acids (e.g., phthalic acid, hexahydrophthalic acid, adipic acid, maleic acid, terephthalic acid, isophthalic acid, sebacic acid, dodecanedioic acid, and the like) or their anhydrides with organic polyols containing primary or secondary hydroxyl groups (e.g. ethylene glycol, butylene glycol, neopentyl glycol, and cyclohexanedimethanol).

Polyurethanes are another class of materials which can be used to form the plastic substrate. Polyurethanes are well-known in the art, and are generally prepared by the reaction of a polyisocyanate and a polyol. Examples of useful polyisocyanates include hexamethylene diisocyanate, toluene diisocyanate, isophorone diisocyanate, and biurets and triisocyanurates of these diisocyanates. Examples of useful polyols include low molecular weight aliphatic polyols, polyester polyls, polyether polyols, fatty alchohols, and the like.

Examples of other materials from which the substrate may be formed include acrylonitrile-butadiene-styrene, VALOX® (polybutylenephthalate, available from General Electric Co.) XENOY® (a blend of LEXAN® and VALOX®, available from General Electric Co.) and the like. In the various embodiments of the invention, the substrate comprises a clear polymeric material, such as polycarbonate (PC) (sold under the trademark Lexan® by the General Electric Company), polyestercarbonate (PPC), polyethersulfone (PES) (sold under the trademark Radel® by Amoco), polyetherimide (PEI or polyimide) (sold under the trademark Ultem® by the General Electric Company) and acrylics.

The plastic substrate can be formed in a conventional manner, for example by injection molding, extrusion, cold forming, vacuum forming, blow molding, compression molding, transfer molding, thermal forming, and the like. The article may be in any shape and need not be a finished article of commerce, that is, it may be sheet material or film which would be cut or sized or mechanically shaped into a finished article. The substrate may be transparent or not transparent. The substrate may be rigid or flexible. Blends of the foregoing materials with each other, and blends with additives such as fillers, plasticizers, tints, colors and the like are also contemplated.

The preferred substrate is formed of polycarbonate. The term polycarbonate as used herein also intends blends of polycarbonate with other materials such as polyesters and impact modifiers.

As appreciated by those in the art, the choice of plastic for the substrate and the thickness of the substrate itself is a function of the use setting for the article. Without limitation, the thickness of the substrate is typically not less than 0.05 mm; in other practices the thickness is about 4 mm to about 6 mm.

Bond Layer:

The bond layer (BL) is comprised of a plasma reacted cyclosiloxane wherein said cyclosiloxane has at least one $C_2$ to $C_{10}$ alkenyl group attached to a silicon atom. In one embodiment, the cyclosiloxane can be unsubstituted; in another embodiment it can be organo-substituted with one or more lower alkyl groups of $C_1$ to $C_3$, i.e. the cyclosiloxane can be substituted with one or more methyl, ethyl, propyl and/or isopropyl groups or combinations of same. In particular practices, the cyclosiloxane is configured as a cyclic trimer (or cyclotrisiloxane); a cyclic tetramer (or cyclotetrasiloxane); or a cyclic pentamer (or cyclopentasiloxane). At least one alkenyl group having 2 to 10 carbon atoms is attached directly to a silicon atom of the cyclosiloxane. In a particular embodiment, only one such alkenyl group is so attached. For practices where the alkenyl group has 3 or more carbon atoms, the double bond can be located anywhere in the moiety. In another embodiment, the alkenyl group in this regard has a terminal carbon-carbon double bond. Examples of alkenyl groups include vinyl, allyl, hexenyl and the like.

Without limitation, a particular cyclosiloxane contemplated by the invention has the structure:

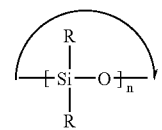

wherein each R is independently hydrogen, methyl or ethyl with the proviso that at least one R is a $C_2$ to $C_{10}$ alkenyl group, and n is an integer from 2 to 8.

In one embodiment of this practice, at least one R is a $C_2$ to $C_6$ alkenyl group, and n is 3, 4 or 5.

In another embodiment of this practice, each R is methyl with the proviso that only one R is a $C_2$ to $C_6$ alkenyl group, for example, vinyl, and n is 4. In an particular embodiment of the invention the cyclosiloxane is heptamethyl(vinyl) cyclotetrasiloxane (Vinyl-D4).

The cyclosiloxane bond layer can be applied to the plastic substrate by plasma deposition methods known in the art, for example by plasma enhanced chemical vapor deposition (PECVD) as described e.g. in U.S. Pat. No. 6,420,032, by inductively coupled plasma (ICP), electron cyclotron resonance (ECR) and the like, or by expanding thermal plasma (ETP), especially in-line ETP as described in commonly-owned U.S. Pat. No. 6,397,776. The plastic substrate may be cleaned in known manners prior to the deposition of the cyclosiloxane, such as by being washed with alcohol solvents, e.g. ispropanol.

The thickness of the bond layer depends upon the plastic substrate and the nature of the use setting for the article as aforesaid. Without limitation, use settings include those where the article is preferably a vehicle window, such as a car, truck, motorcycle, tractor, boat or airplane window. The substrate may also comprise a display screen, such as a television screen, LCD screen, computer monitor screen, a plasma display screen or a glare guard for a computer monitor. These screens also benefit from being coated with a UV absorption and IR reflective layers to prevent the screen from turning yellow and to prevent UV radiation and heat from damaging electronic components inside the display. The substrate may also comprise an electronic device substrate, such as a solar cell or a liquid crystal display (LCD) substrate. Without restriction, the bond layer in the ordinary course is no less than 10 nm thick. In various practices, the bond layer is about 20 nm to about 100 nm thick. For still other practices it is about 200 nm to about 500 nm thick.

After the bond layer has been deposited by plasma reaction, other coatings may be applied on top of same as needed. For example, one or more UV absorption layers which are typically but need not be metal oxides, may be applied. By way of exemplification only, preferred metal oxides include zinc oxide (ZnO), doped zinc oxides such as indium doped zinc oxide (IZO) and aluminum doped zinc oxide (AZO), titanium dioxide ($TiO_2$), cerium oxide ($Ce_2O_3$) and the like as known in the art. Other coatings include transparent conducting coatings formed of materials such as indium tin oxide (ITO), tin oxide ($SnO_2$) and the like as known in the art.

In yet another practice, one or more abrasion resistant coatings may optionally be employed, for example, such coatings may be applied over the UV absorbing layer. Abrasion resistant layers in this regard include those known in the art, e.g. those formed of plasma reacted and oxidized organosilicon materials such as D4, HMDSO, TMDSO and the like.

IR reflective coatings may also be optionally employed. As known in the art, these include, without limitation, metals such as silver (Ag) and aluminum (Al), and IR reflective oxides such as e.g. ITO; and including multi-layer stacks such as, without limitation, $TiO_2/Ag/TiO_2$; ZnO/Ag/ZnO; IZO/Ag/IzO; and AZO/Ag/AZO and their combinations.

The invention is generally useful for any application requiring the use of coatings on plastic substrates. More specifically, it is useful as a bond layer for applications such as automotive windows, headlamps and body panels, architectural windows, displays, solar cells and collectors, aircraft windows and canopies, and appliances. The most specific application is automotive glazing.

The following example is illustrative only and is not restrictive of scope.

EXAMPLE

Plasma reaction of heptamethyl(vinyl)cyclotetrasiloxane (vinyl-D4) onto polycarbonate (PC) substrates was used as a bond layer for UV filtering and abrasion resistant coatings to improve their resistance to thermal cycling and hydrolytic stability. All depositions were performed using an expanding thermal plasma (ETP) in an in-line configuration as described in U.S. Pat. No. 6,397,776. A separate ETP was used for each of the layers. PC sheets were cleaned with isopropyl alcohol, rinsed, air dried, then baked overnight at 80° to 100° C. in vacuum. Substrates were loaded onto a rack in a load lock, pumped down to typically 1 mT then introduced into the in-line coater. The substrates were coated by translating past a series of ETPs. Typically, the first station was an infra-red (IR) heater to raise the surface temperature of the PC to the desired level prior to the bond layer deposition.

For comparison, similar bond layers were formed using a variety of organosilicones, such as octamethylcyclotetrasiloxane (D4), dimethyldimethoxysilane (DMDMS), vinyltrimethylsilane (VTMS) and tetramethyldisiloxane (TMDSO). The criteria for comparison was initial adhesion to the PC measured either by a cross hatch tape test (ASTM 1044 using a rating system with units of 1B to 5B) or a tensile pull test, adhesion after water immersion at 65° C. for 3 days ("WS adh"), and adhesion or cracking after 10 thermal cycles from −50 to 135° C.

The performance of the coating as a bond layer was evaluated by repeating these tests on a 6-layer system consisting of the PC/BL/UV absorbing layer and 4 abrasion resistant layers. The UV absorbing layer was comprised of ZnO as described in U.S. Pat. No. 6,420,032. The abrasion resistant layers were each made of plasma polymerized and oxidized D4. Table 1 compares the performance of these BL materials. Performance of the package is labeled "P-adh" and "P-WS adh" for initial adhesion and adhesion after water immersion. All of the materials studied provided good compliance to the stack during thermal cycling such that the 6-layer package passed the thermal cycle test with no loss of adhesion or cracking. The key differentiator was adhesion as initially deposited and after water immersion both as a stand alone coating and as a bond layer for the 6-layer structure. As shown in Table 1, V-D4 exhibited excellent adhesion initially and after water immersion both as a stand alone coating and as a bond layer for the 6-layer structure. For V-D4, a total of 34 samples were evaluated before and after water immersion. The mean adhesion and standard deviations were 3377 and 1617 initially and 2838 and 1243 after immersion showing no statistically significant deterioration after water immersion.

The package also passed the cross hatch test (5B adhesion) after thermal cycling and water immersion. Several samples have also passed 6 days immersion. To further stress the bond layer, coatings of increasing thickness from 100 to 600 nm were applied to the PC. With V-D4, no difference in performance was observed. In comparison, D4 without the vinyl group had very low adhesion, which deteriorated after water immersion even for very thin coatings. Coatings of approximately 300 nm and greater failed water immersion. Packages with a thin D4 bond layer deteriorated during 3-day water immersion to typical values of 2–3B and several samples of 1B with spontaneous delamination. The performance of DMDMS was slightly better than D4 with improved initial adhesion, 1787 psia, but poor water soak performance, 316 psia. Package performance was typical of D4 with good initial adhesion but poor water soak performance, typical values being of 2–3B and several samples were 1B with spontaneous delamination. VTMS had good initial adhesions but also poor water soak performance. Most packages with VTMS bond layers, however, spontaneously delaminated during water immersion. TMDSO had poor initial adhesion and poor water immersion performance. An additional feature of the V-D4 bond layer is that no plasma treatment of the PC substrate is required, thus eliminating one process step and associated cost.

Moreover, the practice of the present invention provides improved robustness to practice where oxygen is added to the plasma. For example, in practices heretofore, when additional oxygen was provided to the plasma using, e.g. D4 or DMDMS as hard layers, delamination occurred at thinner coating thicknesses, e.g. on the order of 300 nm. In contrast, the present invention, e.g. non-limitingly as embodied in the use of V-D4 as a bond layer, permits incorporation of about 0.2 liters per minute (LPM) to about 0.06 LPM of added oxygen to the plasma while maintaining adhesion even at the thicker coatings. e.g., 600 nm.

TABLE 1

COMPARISON OF BOND LAYER MATERIALS

| Material | Adhesion Psia, or B | WS adh Psia, or B | Max Thickness nm | P-adh Psia, B | P-WS adh Psia, B |
|---|---|---|---|---|---|
| V-D4 | 3377 | 2838 | >600 | 5B | 5B |
| D4 | 197 | 84 | <300 | 5B | 2–3B |
| DMDMS | 1878 | 316 | <300 | 5B | 2–3B |
| VTMS | 2000 | 5B | <400 | 5B | 1–2B |
| TMDSO | 300 | 4B | — | 5B | 0B |

The invention claimed is:

1. An article comprising:
a plastic substrate; and
a bond layer on a surface of said plastic substrate, said bond layer comprising a recombined cyclosiloxane, wherein the recombined cyclosiloxane is the product of a plasma deposition process including cyclosiloxane precursor, wherein said cyclosiloxane precursor has at least one $C_2$ to $C_{10}$ alkenyl group attached to a silicon atom.

2. The article of claim 1 wherein said cyclosiloxane has the structure:

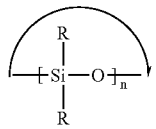

wherein each R is independently hydrogen, methyl or ethyl with the proviso that at least one R is a $C_2$ to $C_6$ alkenyl group; and n is an integer from 2 to 8.

3. The article of claim 2 wherein at least one R is a $C_2$ to $C_6$ alkenyl group; and n is 3, 4 or 5.

4. The article of claim 3 wherein each R is methyl with the proviso that only one R is a $C_2$ to $C_6$ alkenyl group.

5. The article of claim 4 wherein said alkenyl group has a terminal carbon-carbon double bond.

6. The article of claim 5 wherein said ailcenyl group is vinyl; and n is 4.

7. The article of claim 1 wherein said plastic substrate is comprised of a thermoplastic or thermoset polymer.

8. The article of claim 6 wherein said plastic substrate is selected from the group consisting of polyethylene, polypropylene, polystyrene, polyvinylalcohol, polyvinylacetal, polymethacrylate ester, polyacrylic acids, polyether, polyester, polycarbonate, cellulous resin, polyacrylonitrile, polyamide, polyimide, polyvinyichioride, fluorine-containing resin and polysulfone, acrylic polymer and polyurethane.

9. The article of claim 1 wherein said bond layer is no less than 10 nm thick.

10. The article of claim 1 further comprising one or more additional coatings on top of said bond layer, said additional coatings being one or more UV absorption layers, one or more abrasion resistant layers, one or more transparent conducting layers, or one or more IR reflective layers.

11. An article comprising:
a thermoset or thermoplastic substrate; and
a bond layer on the surface of said substrate, said bond layer comprised of a recombined cyclosiloxane, wherein the recombined cyclosiloxane is the product of a plasma deposition process including cyclosiloxane precursor, wherein said cyclosiloxane precursor has one $C_2$ to $C_6$ ailcenyl group attached to a silicon atom, said cyclosiloxane being a cyclotrisiloxane, a cyclotetrasiloxane or a cyclopentasiloxane.

12. The article of claim 11 wherein said substrate is thermoplastic; and said cyclosiloxane is a cyclotetrasiloxane; and said aklenyl group is vinyl.

13. A multilayer article comprising:
a polycarbonate substrate; and
a bond layer on the surface of said polycarbonate substrate, said bond layer comprising plasma reacted heptamethyl(vinyl)cyclotetrasiloxane.

14. A method of forming a multilayer article comprising:
providing a plastic substrate; and
plasma reacting a cyclosiloxane onto a surface of said plastic substrate to form a bond layer, said cyclosiloxane having at least one $C_2$ to $C_{10}$ alkenyl group attached to a silicon atom.

15. The method of claim 14 wherein said plasma reacting is performed by expanding thermal plasma, plasma enhanced chemical vapor deposition, inductively coupled plasma or electron cyclotron resonance.

16. The method of claim 14 wherein said cyclosiloxane has the structure:

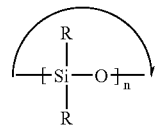

wherein each R is independently hydrogen, methyl or ethyl with the proviso that at least one R is a $C_2$ to $C_6$ alkenyl group; and n is an integer from 2 to 8.

17. The method of claim 16 wherein at least one R is $C_2$ to $C_6$ alkenyl group, and n is 3, 4 or 5.

18. The method of claim 17 wherein each R is methyl with the proviso that only one R is a $C_2$ to $C_6$ alkenyl group.

19. The method of claim 18 wherein said alkenyl group has a terminal carbon-carbon double bond.

20. The method of claim 19 wherein said alkenyl group is vinyl; and n is 4.

21. The method of claim 14 wherein said plastic substrate is comprised of a thermoplastic or thermoset polymer.

22. The method of claim 21 wherein said plastic substrate is selected from the group consisting of an polyethylene, polypropylene, polystyrene, polyvinylalcohol, polyvinylacetal, polymethacrylate ester, polyacrylic acids, polyether, polyester, polycarbonate, cellulous resin, polyacrylointrile, polyamide, polyimide, polyvinylchloride, fluorine-containing resins and polysulfone, acrylic polymers and polyurethane.

23. The method claim 11 wherein said bond layer is deposited to a thickness of about 200 nm to about 500 nm.

24. The method of claim 12 further comprising depositing a UV absorbing layer on top of said bond layer, said UV absorbing layer comprised of $ZnO$, $TiO_2$ or $Ce_2O_3$.

25. A method of forming a multilayer article comprising:
providing a thermoset or thermoplastic substrate; and
plasma reacting a cyclosiloxane onto a surface of said substrate to form a bond layer, said cyclosiloxane having one $C_2$ to $C_6$ alkenyl group attached to a silicon atom, said cyclosiloxane being a cyclotrisiloxane, a cyclotetrasiloxane, or a cyclopentasiloxane.

26. The method of claim 25 wherein said substrate is thermoplastic and said cyclosiloxane is a cyclotetrasiloxane and said alkenyl group is vinyl.

27. A method of making a multilayer article comprising:
providing a polycarbonate substrate; and
plasma reacting heptamethyl(vinyl)cyclotetrasiloxane onto a surface of said polycarbonate substrate to form a bond layer.

28. The method of claim 27 further comprising depositing one or more abrasion resistant layers atop of said bond layer.

* * * * *